United States Patent [19]
Brown

[11] Patent Number: 5,825,972
[45] Date of Patent: Oct. 20, 1998

[54] DIRECT CURRENT FAN MOTOR SPEED CONTROLLER

[75] Inventor: Alan E. Brown, Georgetown, Tex.

[73] Assignee: Dell USA, L.P., Round Rock, Tex.

[21] Appl. No.: 874,348

[22] Filed: Jun. 13, 1997

Related U.S. Application Data

[63] Continuation of Ser. No. 390,198, Feb. 17, 1995, abandoned.

[51] Int. Cl.$^6$ ........................................................ G02P 7/00
[52] U.S. Cl. .................................................................. 388/811
[58] Field of Search ...................................... 388/611, 603, 388/632, 599, 799–815, 811, 812, 814, 937, 934, 907; 363/41, 44, 55, 58

[56] References Cited

U.S. PATENT DOCUMENTS

| | | | |
|---|---|---|---|
| 3,622,852 | 11/1971 | Myers | 388/811 |
| 3,676,659 | 7/1972 | Asmussen | 318/632 |
| 3,967,173 | 6/1976 | Stich | 363/41 |
| 4,099,109 | 7/1978 | Abbodanti | 318/811 |
| 4,103,281 | 7/1978 | Strom et al. | 388/814 |
| 4,240,014 | 12/1980 | Muller . | |
| 4,488,216 | 12/1984 | Gyugyi et al. | 318/810 |
| 4,516,060 | 5/1985 | Guzik et al. | 388/811 |
| 4,591,767 | 5/1986 | Koide | 388/811 |
| 4,595,868 | 6/1986 | Louth | 318/603 X |
| 4,680,516 | 7/1987 | Guzik et al. | 388/811 |
| 5,384,526 | 1/1995 | Bennett | 318/610 |
| 5,436,827 | 7/1995 | Gunn et al. . | |
| 5,469,320 | 11/1995 | Walker et al. . | |
| 5,623,594 | 4/1997 | Swamy . | |

*Primary Examiner*—Jonathan Wysocki
*Attorney, Agent, or Firm*—Skjerven, Morrill, MacPherson, Franklin & Friel, L.L.P.; Stehen A. Terrile

[57] ABSTRACT

A minimum fan RPM control circuit constantly turns a computer exhaust fan at a minimum RPM while the computer is on. The RPM control circuit includes a blanking and reset circuit responsive to a ramp signal, for generating a reset pulse at a reset output. The RPM control circuit also includes a latch circuit conductively coupled to the reset output, the latch circuit responsive to the reset pulse, and responsive to a tachometer pulse, for generating a latch pulse at a latch circuit output. The RPM control circuit further includes an integration node conductively coupled to the latch circuit output, and responsive to the latch pulse, for generating an integral signal of the latch pulse. Finally, the RPM control circuit includes a power switch driver conductively coupled to the integration node, and responsive to the ramp signal and the integral signal, for generating an RPM control pulse.

23 Claims, 5 Drawing Sheets

DIRECT CURRENT FAN MOTOR SPEED CONTROLLER

This application is a continuation of application Ser. No. 08/390,198, filed Feb. 17, 1995, now abandoned.

TECHNICAL FIELD

This invention relates to fan speed control circuits, and in particular to a control circuit suitable for regulating the speed of a brushless DC exhaust fan of a personal computer.

BACKGROUND OF THE INVENTION

U.S. Pat. No. Re. 33,167 discloses a "circuit arrangement for monitoring speed of a drive motor." It apparently does not control the speed of the fan motor, but merely monitors the speed. In the first embodiment, a "motor 10 drives a tachogenerator 14, supplying at its output rectangular pulses 16." Col. 2, lines 61–63. In another embodiment, the input signal is obtained using a sensor magnet 218 and a sensor coil 215. Col. 8, lines 36–41.

U.S. Pat. No. 5,125,571 discloses a "variable speed control of livestock ventilation fans using discrete feedback of motor speed." The first embodiment includes a "centrifugal switch 22 incorporated in the housing of motor 20 and designed to open when motor 20 is above the predetermined minimum speed and to close when it is below that level." Col. 2, line 67 to Col. 3, line 2. When the switch 22 opens, the motor 20 is energized for maximum speed. Col. 3, lines 33–43. The design further includes a speed controller 24 coupled to a thermistor, or temperature probe 26. The second embodiment, disclosed in FIGS. 4–8, includes a microprocessor 54, a ROM 56, an address decoder 58, a peripheral interface adapter 60, and an analog input/output circuit 62, which elements are used to implement "motor speed increases in relatively small increments in order to prevent sudden jumps to maximum motor speed when centrifugal switch 22 closes." Col. 4, lines 51–54. This design is far too complex and expensive for use in a personal computer.

To reduce ambient acoustical noise, and to reduce power consumption, personal computer manufacturers have attempted to limit the revolutions per minute ("RPM") of the exhaust fan. Many personal computers now include some circuitry for controlling and/or reducing the speed of the exhaust fan. Prior art circuitry usually has been direct active control by altering the base current of a bi-polar pass element, in response to a signal from a thermistor used to monitor a heat sink.

The exhaust fan speed control has been inconsistent. This is in part due to the differences in the sleeve bearings of the fans, and in part due to the wear on the bearings from use. The result has been many instances of the fan not turning. Attempts to solve this problem have included using a thermistor within a closed-loop control circuit, and controlling the speed by modulating the width of the DC power pulse to the fan motor, rather than by a linear speed control.

However, such attempts have been unsuccessful because often less energy is required to keep the fan turning at a desired low RPM than is required to start the fan turning. Furthermore, even when the temperature sensed by the thermistor is not enough to need cooling by the fan, customers and factory inspectors have become used to having the fan turn, and become concerned when the fan is not turning.

In this specialized context, therefore, what is needed is a minimum fan RPM control circuit which is capable of running the exhaust fan at low RPM, and yet capable of supplying sufficient power to start the fan turning.

SUMMARY OF THE INVENTION

The foregoing problems are solved and a technical advance is achieved by the provision of a minimum fan RPM control circuit employing a closed-loop pulse-width modulated power supply.

In the preferred embodiment, a minimum fan RPM control circuit is provided for constantly turning a computer exhaust fan at a minimum RPM while the computer is on. The RPM control circuit includes a blanking and reset circuit responsive to a ramp signal for generating a reset pulse at a reset output, a latch circuit conductively coupled to the reset output, the latch circuit responsive to the reset pulse, and responsive to a tachometer pulse, for generating a latch pulse at a latch circuit output, an integration node conductively coupled to the latch circuit output, and responsive to the latch pulse, for generating an integral signal of the latch pulse, and a power switch driver conductively coupled to the integration node, and responsive to the ramp signal and the integral signal, for generating an RPM control pulse.

A technical advantage achieved with the invention is the provision of a control circuit that will keep the exhaust fan turning at low RPM, using less energy than the energy required to start the fan turning.

Another technical advantage achieved is that the pulsing action of the supplied power helps to start the fan when the fan is in a "dead spot", that is, momentarily "frozen".

Another technical advantage achieved is that the RPM control circuit provides a longer burst of full voltage to the fan motor at startup.

BRIEF DESCRIPTION OF THE DRAWINGS

The above-noted and other aspects of the present invention will become more apparent from a description of the preferred embodiment when read in conjunction with the accompanying drawings. The drawings illustrate the preferred embodiment of the invention. In the drawings the same members have the same reference numerals.

DETAILED DESCRIPTION OF THE PREFERRED EMBODIMENT

Figure 1:
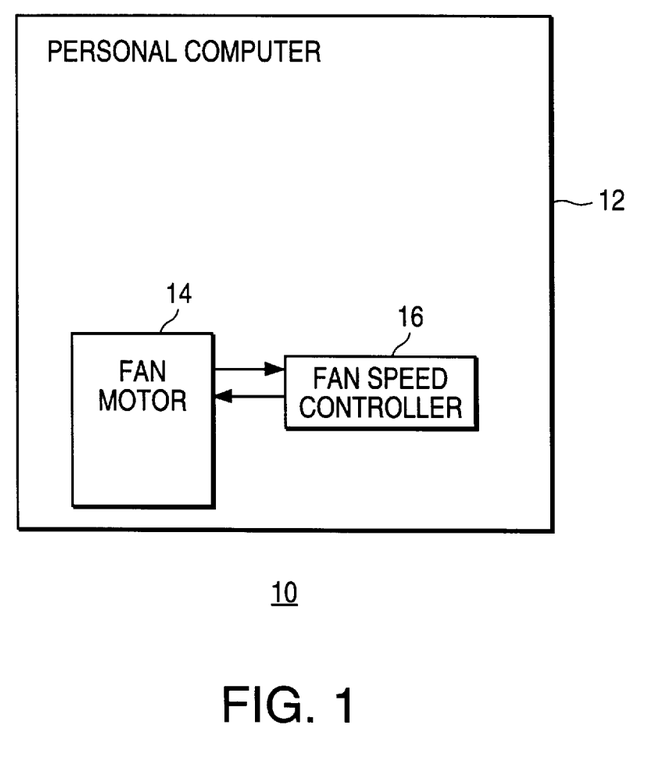
FIG. 1 is a schematic plan view of a computer employing a fan motor and a fan speed controller built according to the present invention.

FIG. 1 depicts a generalized personal computer 10, comprising a chassis 12, which normally has a cover (not shown for clarity). A fan motor 14 mounts in the chassis for cooling the internal circuitry. A fan motor speed controller circuit 16 mounts in the chassis 12 and conductively couples to the fan motor 14.

Figure 2:
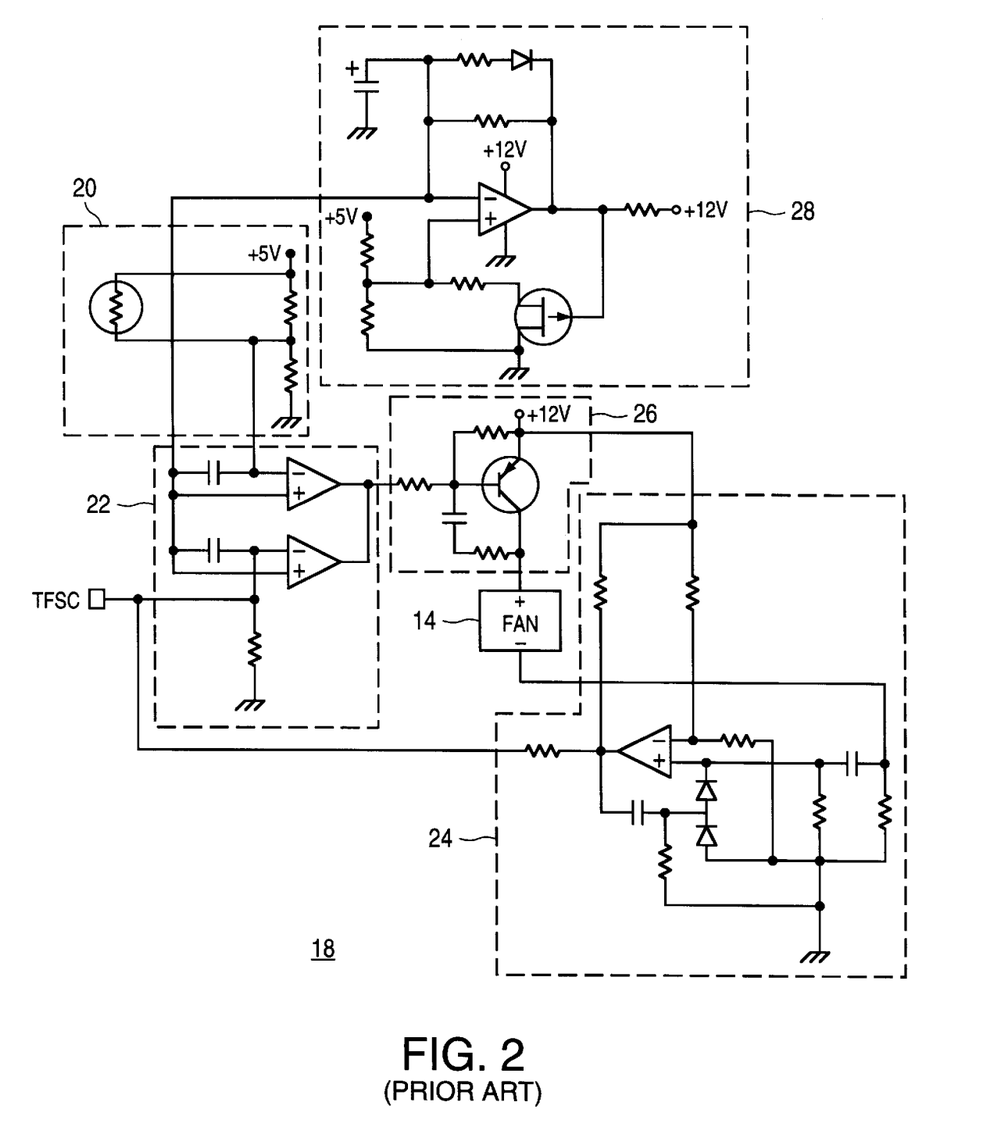
FIG. 2 is a detailed schematic of a prior art thermal fan speed control circuit.

FIG. 2 is a detailed schematic of a prior art thermal fan speed control circuit 18. The control circuit 18 includes a thermal sensor network 20, an input signal circuit 22, an electronic tachometer 24, a power switch circuit 26, and a ramp oscillator 28. The tachometer 24 pulses high when one of the fan motor's 14 four poles are crossed when the fan motor 14 is energized.

Figure 3:
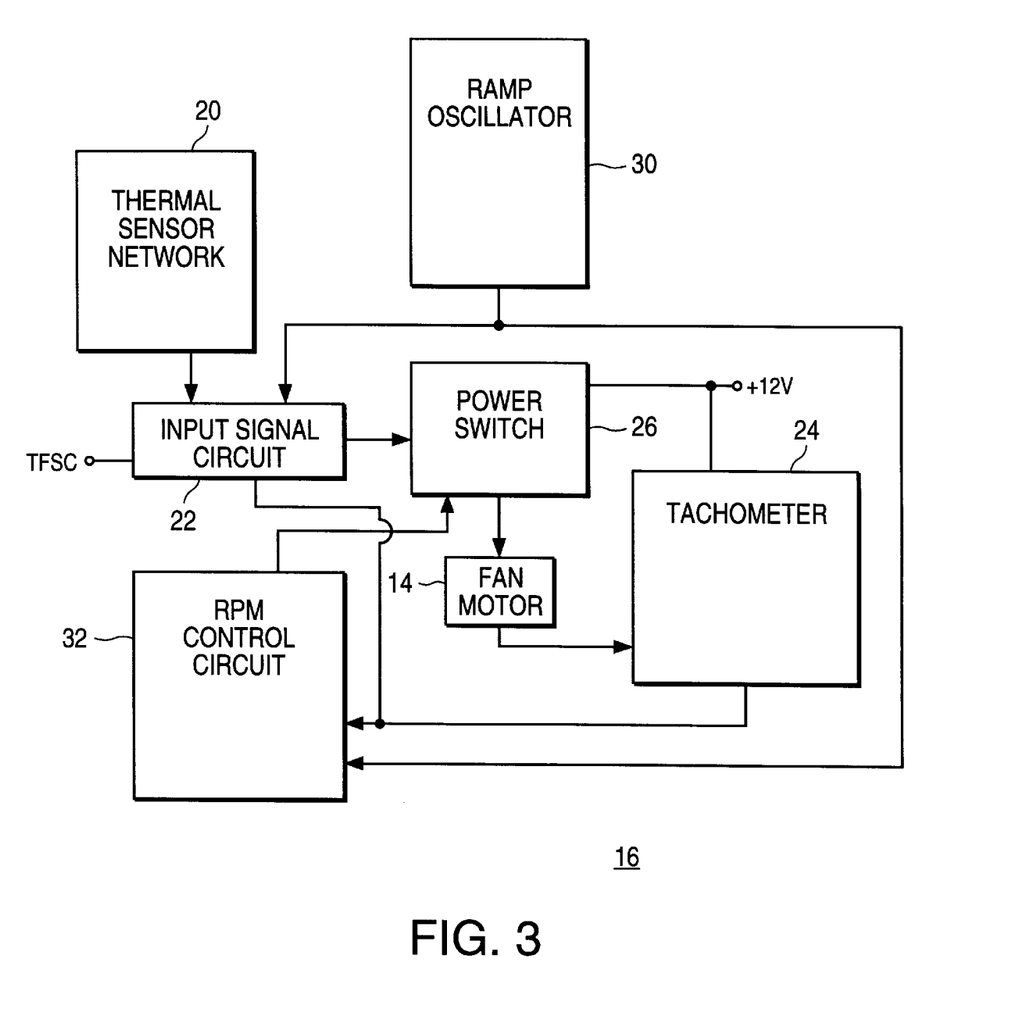
FIG. 3 is a schematic plan view of a fan motor speed controller circuit built according to the present invention.

FIG. 3 depicts in a schematic plan view, a fan motor speed controller circuit 16 built according to the present invention. The controller circuit 16 includes the prior art elements 20, 22, 24, and 26. However, in addition it includes a modified ramp oscillator 30 and an RPM control circuit 32.

Figure 4:
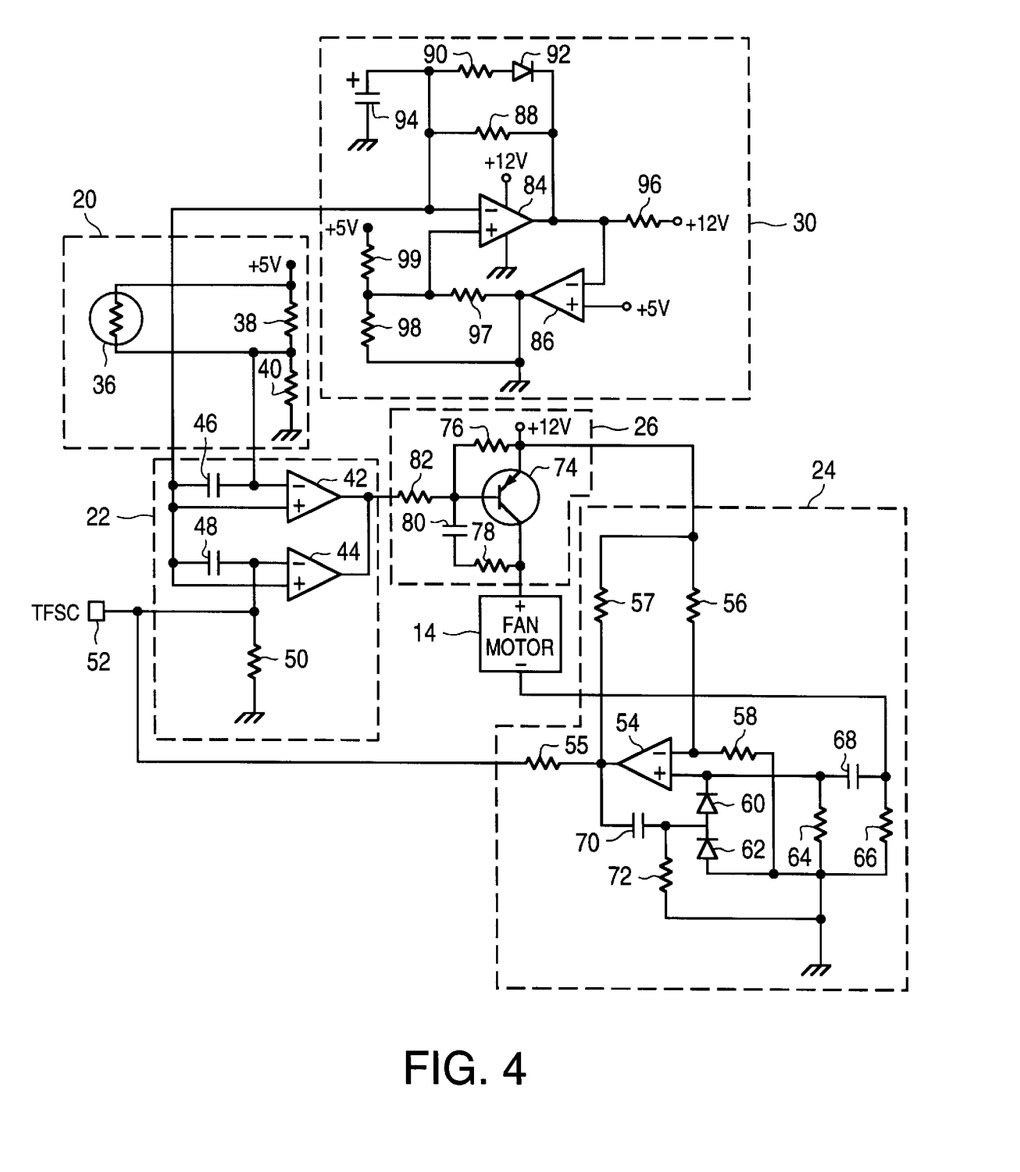
FIG. 4 is a detailed schematic of a fan motor speed controller circuit built according to the present invention, but without a fan RPM control circuit.
Figure 5:
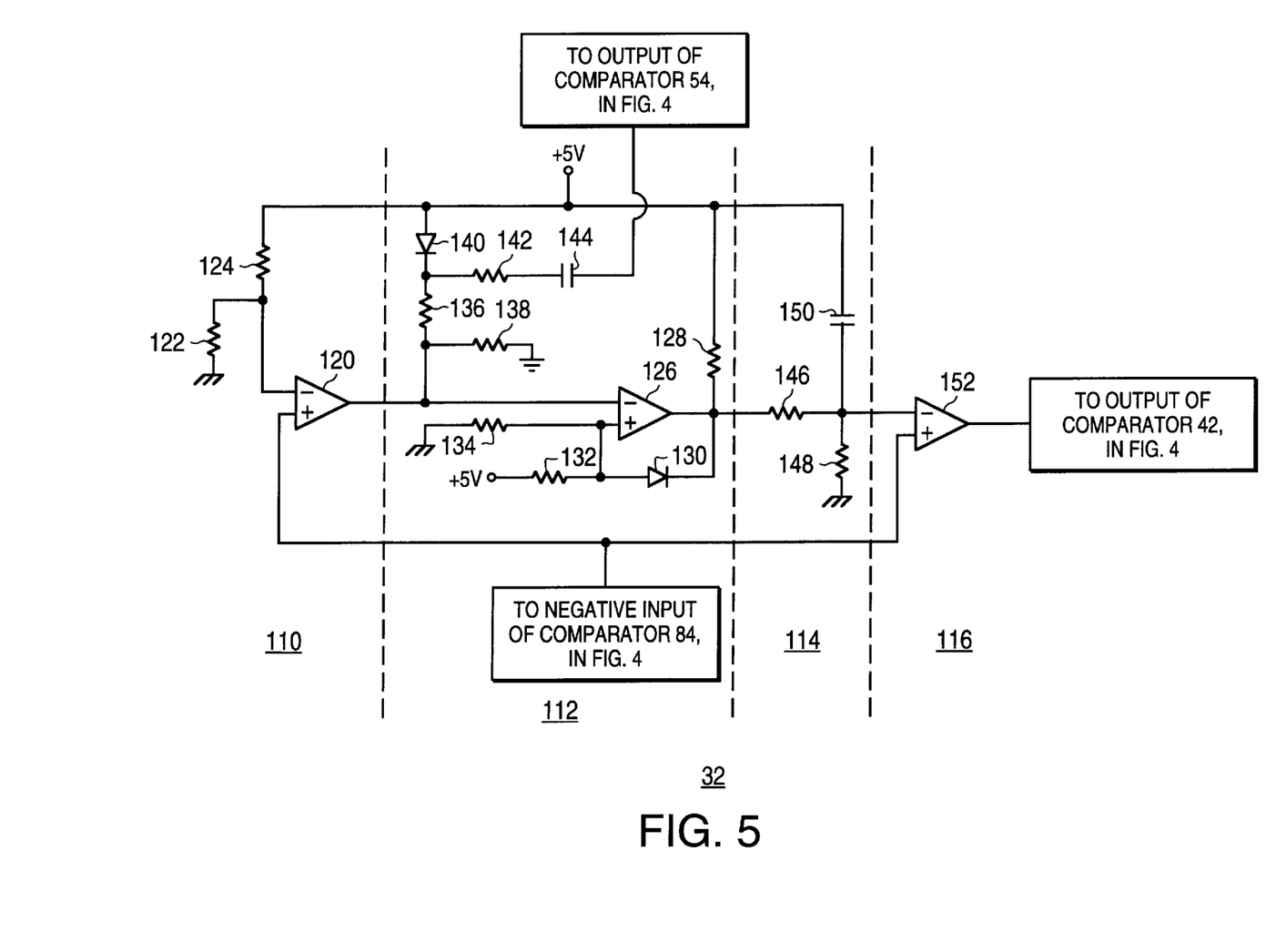
FIG. 5 is a detailed schematic of a fan RPM control circuit built according to the present invention.

FIG. 4 depicts in a detailed schematic the fan motor speed controller circuit 16 built according to the present invention, but without the fan RPM control circuit 32, which is depicted in FIG. 5. The thermal sensor network 20 includes a thermistor 36 for sensing the temperature of the air in the computer. Connected to the thermistor 36 is a voltage divider network consisting of resistors 38 and 40 between five volts and ground. Connected to the junction of resistors 38 and 40 is the input signal circuit 22. The input signal circuit 22 includes two comparators 42, 44 with their outputs tied together. A negative input of the comparator 42 is connected to the junction of the resistors 38 and 40.

Also connected to the negative input of the comparator 42 is a capacitor 46, and connected to the negative input of the comparator 44 is a capacitor 48. The other sides of the capacitors 46, 48 are connected in parallel with the positive inputs of the comparators 42 and 44, to the output of the ramp oscillator 30. The negative input of the comparator 44 is connected in series with the resistor 50 to ground and is also connected to an auxiliary input 52, and is connected to an output of the electronic tachometer 24.

The electronic tachometer 24 includes a comparator 54 with a resistor 55 in series between the output of the comparator 54 and a negative input of the comparator 44. A voltage divider network consisting of resistors 56 and 58 is connected to the negative input of the comparator 54, and is connected between positive twelve volts and ground, which results in a low DC voltage at the negative input of the comparator 54. A resistor 57 is connected between the output of the comparator 54 and a positive twelve volts. Connected to the positive input of the comparator 54 are two diodes 60 and 62 in series from ground. Also connected to the positive input of the comparator 54, and in parallel with the series of the two diodes 60 and 62 is a resistor 64, which is also connected to ground. Parallel with the resistor 64 is a resistor 66 in series with a capacitor 68. The resistor 64 and the capacitor 68 form a high pass filter. The junction of the resistor 66 and the capacitor 68 is connected to the negative input of the fan motor 14. Connected in parallel with the diode 62 is a resistor 72. A capacitor 70 is connected between the output of the comparator 54 and the junction of the two diodes 60 and 62, and provides positive feedback.

The power switch circuit 26 includes a transistor 74. The emitter of the transistor 74 is connected to a positive twelve volts, and the collector of the transistor 74 is connected to the positive input of the fan motor 14. Connected between the source and the base of the transistor 74 is a resistor 76. Connected between the base and collector of the transistor 74 is a resistor 78 in series with a capacitor 80. Connected between the base of the transistor 74 and the output of the comparator 42 of the input signal circuit 22 is a resistor 82. The modified ramp oscillator 30 includes a comparator 84 and a comparator 86. As with all the comparators in FIGS. 2, 4, and 5, the comparator 84 has a supply voltage of positive twelve volts. Connected across the negative input of the comparator 84 and its output is a resistor 88. Connected in parallel with the resistor 88 is a resistor 90 in series with a diode 92. A capacitor 94 is connected between the negative input of the comparator 84 and ground. A resistor 96 is connected between the output of the comparator 84 and positive twelve volts. A resistor 97 is connected between the output of the comparator 86 and the positive input of the comparator 84. The negative input of the comparator 86 is connected to positive five volts, and the positive input of the comparator 86 is connected to the output of the comparator 84. A voltage divider network comprising resistors 98 and 99 is connected to the positive input of the comparator 84, between positive five volts and ground.

FIG. 5 depicts in a detailed schematic the fan RPM control circuit 32 built according to the present invention. The fan RPM control circuit 32 includes a blanking and reset circuit 110 conductively coupled to a latch circuit 112, which in turn is connectively coupled to an integration node 114, which is conductively coupled to a power switch driver circuit 116. The blanking and reset circuit 110 includes a comparator 120. At the negative input of the comparator 120 is a voltage divider circuit consisting of resistors 122 and 124 connected between ground and positive five volts. The positive input of the comparator 120 is connected to the negative input of the comparator 84 in FIG. 4. The output of the comparator 120 is connected to the latch circuit 112, and more specifically, to the negative input of a comparator 126. Connected between the output of the comparator 126 and positive five volts is a resistor 128. Also connected between the output of the comparator 126 and positive five volts is a diode 130 and a resistor 132 in series. The resistor 132 is connected in series with a resistor 134 which is connected to ground. The two resistors 132 and 134 form a voltage divider circuit at the positive input of the comparator 126. At the negative input of the comparator 126 is another voltage divider network comprising resistors 136 and 138. Between the resistor 136 and positive five volts is a diode 140. At the junction of the resistor 136 and the diode 140 is a resistor 142 in series with a capacitor 144 and the output of the comparator 54 in FIG. 4. The output of the comparator 126 connects to the integration node 114, and more specifically to a resistor 146. Connected between the resistor 146 and ground is a resistor 148. Connected between the resistor 146 and positive five volts is a capacitor 150. The junction of the resistor 146, the resistor 148, and the capacitor 150 comprises the integration node 114, which is connected to the negative power switch driver circuit 116, and more specifically, to a negative input of a comparator 152. The positive input of the comparator 152 is connected to the negative input of the comparator 84 in FIG. 4. The output of the comparator 152 is connected to the output of the comparator 42 in FIG. 4.

The eight comparators shown in the figures are bought as two packages of four comparators. In the preferred embodiment, the package is an integrated quadruple comparator circuit, Model No. LM339, manufactured by National Semiconductor, Santa Clara, Calif. The transistor 74 is Model No. 2N2907, manufactured by Texas Instruments, Dallas, Tex. The thermistor 36 is a Model No. 2322-640-63103, manufactured by Philips, The Netherlands. The values of the resistors and capacitors shown in the figures are listed below:

| RESISTORS | | CAPACITORS | |
|---|---|---|---|
| Element No. | Value in ohms | Element No. | Value in micro farads |
| 38 | 5.1K | 46 | .001 |
| 40 | 1.5K | 48 | .001 |
| 50 | 100K | 68 | .033 |
| 55 | 2.2M | | |
| 56 | 47K | 70 | .1 |
| 57 | 2K | 80 | .1 |
| 58 | 100 | 94 | 2.2 |
| 64 | 4.7K | 144 | .01 |
| 66 | 2.2 | 150 | 4.7 |
| 72 | 10K | | |
| 76 | 2K | | |
| 78 | 100 | | |
| 82 | 2K | | |
| 88 | 68K | | |
| 90 | 1K | | |
| 96 | 2K | | |
| 97 | 5.1K | | |
| 98 | 20K | | |
| 99 | 20K | | |
| 122 | 1K, 1% accuracy | | |
| 124 | 3.65K, 1% accuracy | | |
| 128 | 2K | | |
| 132 | 10K | | |
| 134 | 15K | | |
| 136 | 20K | | |
| 138 | 10K | | |
| 142 | 10K | | |
| 146 | 360K | | |
| 148 | 300K | | |

In operation, the comparator 120 defines the dead-time at the beginning of the ramp signal at the negative input of the comparator 120. The comparator 120 also sets the latch circuit 112, and more specifically, the comparator 126. After a dead time of about 3 milliseconds, the comparator 126 is looking for a "high going" signal from the electronic tachometer 24, which is a positional indication of a fan's pole. The more time needed in each cycle to obtain a pole, the higher the voltage is at the negative input of the comparator 152. The comparator 152 drives the transistor 74.

The voltage at the negative input of the comparator 152 is thus inversely proportional to the RPM of the fan motor 14. That voltage is compared to the timing ramp signal at the negative input of the comparator 84. If the fan is not meeting the minimum set RPM, then the voltage at the negative input of the comparator 152 increases until the fan motor 14 meets the minimum RPM. More specifically, the duty cycle of the output of the comparator 126 determines the charge in the capacitor 150. This duty cycle is averaged by the timing difference of the beginning of a normal timing ramp signal at the negative input of the comparator 84, after a three millisecond blanking pulse window to disallow the first pulse from the tachometer 24, and the very next fan pole detected by the tachometer 24. If fan poles are not detected often enough, the voltage at the negative input of the comparator 152 increases until the minimum RPM is met.

The ratio of the resistors 146 and 148 will set the general RPM for the fan motor 14 as a minimum value. The comparator 42 or the comparator 44 will command the RPM above a minimum value by proper voltages at the negative inputs of comparators 42 and 44.

The operation of the preferred embodiment can be further understood by considering the output signals of the various parts of the fan motor speed controller circuit 16 of FIG. 3.

The thermal sensor network 20 outputs a DC level of approximately one to two volts DC. The modified ramp oscillator 30 has two outputs. The first output is at the negative input of the comparator 84 (FIG. 4). It is a DC ramp signal which begins at about 0.866 volts, and ends at about 2.5 volts. The period of the ramp is 30 hertz. The second output is at the output of the comparator 84, and is a DC voltage level of twelve volts, with spikes downwards to zero volts, the period being about 30 hertz. The input signal circuit 22 generates an output of pulses, with the "on" level at zero volts, and the "off" level at twelve volts, and the period being 30 hertz. The power switch circuit 26 also generates an output of pulses, with the off level at zero volts, and the on level at twelve volts, and the period being 30 hertz. The output of the power switch circuit 26 is the inverse of the output of the input signal circuit 22. The electronic tachometer 24 generates pulses at the output of the comparator 54, with the on level being at about twelve volts, and lasting about two milliseconds, and the off level being at about zero volts. The on level occurs with each fan pole.

Referring now to FIG. 5, the RPM control circuit 32, the blanking and reset circuit 110 generates an output pulse with a high level of about one and a half volts, and a low level of about zero volts. During the first high level, at startup, there is a spike of about four volts. The period of the high and low levels is 30 hertz. The latch circuit 112 generates a pulse with a high of about five volts, and a low of about zero volts, having a period of about 30 hertz. The integration node 114 generates a DC level of about one and one-half volts, with an initial sloping peak up to about two volts. The length of time to reach steady state is about five seconds. The power switch driver circuit 116 generates a pulse having a high of about twelve volts, and a low of about zero volts, with a period of about 30 hertz.

In summary, a tachometer pulse representing a fan motion is expected within the DC supply voltage pulse to the fan motor 14. If a tachometer pulse is not detected, the DC supply voltage pulse width to the fan motor 14 is lengthened. This is accomplished by a analog closed-loop control path which signals the control element, which modulates the DC supply voltage to the fan motor 14. When special circumstances require additional cooling, a DC voltage between about one volt and two and one-half volts is applied to the auxiliary input 52. The capacitor 150 stores a charge from that voltage, and assures an 800 millisecond burst of twelve volts to the fan motor 14 at startup to assist a sometimes reluctant fan to rotate.

Although an illustrative embodiment of the invention has been shown and described, other modifications, changes and substitutions are intended in the foregoing disclosure. For example, alternative heat dissipators or circuit components could be used consistent with the invention. More than two pass devices could be employed. Different voltage parameters could be satisfied for other types of microprocessor or load circuitry. Accordingly, it is appropriate that the appended claims be construed broadly and consistent with the scope of the invention.

What is claimed is:

1. A revolutions per minute (RPM) control circuit for a direct current (DC) motor comprising:

a blanking and reset circuit responsive to a ramp signal for generating a reset pulse at a reset output;

a latch circuit conductively coupled to the reset output, the latch circuit responsive to the reset pulse, and responsive to a tachometer pulse, for generating a latch pulse at a latch circuit output;

an integration node conductively coupled to the latch circuit output, and responsive to the latch pulse, for generating an integral signal of the latch pulse; and a power switch driver circuit conductively coupled to the integration node, and responsive to the ramp signal and the integral signal, for generating an RPM control pulse.

2. The RPM control circuit of claim 1 wherein the blanking and reset circuit comprises:

a first comparator for generating the reset pulse at the reset output, the first comparator having a first input conductively coupled to the ramp signal; and a voltage divider circuit coupled to a second input of the first comparator, the voltage divider circuit comprising a first resistor connected between the second input and a positive voltage, and a second resistor connected between the second input and ground.

3. The RPM control circuit of claim 1 wherein the latch circuit comprises:

a capacitor connected between the tachometer pulse and a first resistor;

a diode connected between a positive voltage and the first resistor;

a second resistor connected to the junction of the diode and the first resistor;

a second comparator, having a first input connected to the reset output and to the second resistor, an output of the second comparator being the latch circuit output;

a third resistor connected between the first input and ground;

a voltage divider circuit coupled to a second input of the second comparator, the voltage divider circuit comprising a fourth resistor connected between the second input and a positive voltage, and a fifth resistor connected between the second input and ground;

a diode connected between the junction of the fourth and fifth resistors and the output of the second comparator; and a sixth resistor connected between the output of the second comparator and a positive voltage.

4. The RPM control circuit of claim 1 wherein the integration node comprises:

a capacitor connected between a positive voltage and a first resistor;

the first resistor connected between ground and the capacitor; and a second resistor connected between the junction of the first resistor and the capacitor, and the latch circuit output.

5. The RPM control circuit of claim 1 wherein the power switch driver circuit comprises:

a third comparator having a first input connected to the integration node, and a second input conductively coupled to the ramp signal.

6. A direct current (DC) fan motor speed controller comprising:

a thermal sensor network responsive to heat for generating a DC voltage level thermal signal at a thermal sensor network output;

an input signal circuit having a first input conductively coupled to the thermal sensor network output, responsive to the thermal signal, having a second input responsive to a DC voltage ramp signal, for generating an input signal at an input signal circuit output;

a ramp oscillator having a ramp oscillator output conductively coupled to the second input of the input signal circuit for generating the DC voltage ramp signal at the ramp oscillator output;

a power switch circuit having a first input conductively coupled to the input signal circuit output, and responsive to the input signal, and having a second input responsive to a revolutions per minute (RPM) control pulse signal, for generating a DC fan control pulse signal;

a tachometer circuit responsive to a fan motor speed signal for generating a tachometer signal at a tachometer circuit output; and an RPM control circuit having a first input conductively coupled to the ramp oscillator output, and responsive to the DC voltage ramp signal, having a second input conductively coupled to the tachometer circuit output, and responsive to the tachometer signal, for generating at an RPM control circuit output the RPM control pulse signal.

7. A computer comprising:

a direct current (DC) fan motor; and a fan motor speed controller conductively coupled to the DC fan motor, the fan motor speed controller comprising:

a thermal sensor network responsive to heat for generating a DC voltage level thermal signal at a thermal sensor network output;

an input signal circuit having a first input conductively coupled to the thermal sensor network output, responsive to the thermal signal, having a second input responsive to a DC voltage ramp signal, for generating an input signal at an input signal circuit output;

a ramp oscillator having a ramp oscillator output conductively coupled to the second input of the input signal circuit for generating the DC voltage ramp signal at the ramp oscillator output;

a power switch circuit having a first input conductively coupled to the input signal circuit output, and responsive to the input signal, and having a second input responsive to an RPM control pulse signal, for generating a DC fan control pulse signal;

a tachometer circuit responsive to a fan motor speed signal for generating a tachometer signal at a tachometer circuit output; and an RPM control circuit having a first input conductively coupled to the ramp oscillator output, and responsive to the DC voltage ramp signal, having a second input conductively coupled to the tachometer circuit output, and responsive to the tachometer signal, for generating at an RPM control circuit output the RPM control pulse signal.

8. A computer comprising:

a direct current (DC) fan motor; and a fan motor speed controller conductively coupled to the DC fan motor, the fan motor speed controller including a revolutions per minute (RPM) control circuit, the RPM control circuit comprising:

a blanking and reset circuit responsive to a ramp signal for generating a reset pulse at a reset output;

a latch circuit conductively coupled to the reset output, the latch circuit responsive to the reset pulse, and responsive to a tachometer pulse, for generating a latch pulse at a latch circuit output;

an integration node conductively coupled to the latch circuit output, and responsive to the latch pulse, for generating an integral signal of the latch pulse; and a power switch driver circuit conductively coupled to the integration node, and responsive to the ramp signal and the integral signal, for generating an RPM control pulse.

9. The RPM control circuit of claim 8 wherein the blanking and reset circuit comprises:

a first comparator for generating the reset pulse at the reset output, the first comparator having a first input conductively coupled to the ramp signal; and a voltage divider circuit coupled to a second input of the first comparator, the voltage divider circuit comprising a first resistor connected between the second input and a positive voltage, and a second resistor connected between the second input and ground.

10. The RPM control circuit of claim 8 wherein the latch circuit comprises:

a capacitor connected between the tachometer pulse and a first resistor;

a diode connected between a positive voltage and the first resistor;

a second resistor connected to the junction of the diode and the first resistor;

a second comparator, having a first input connected to the reset output and to the second resistor, an output of the second comparator being the latch circuit output;

a third resistor connected between the first input and ground;

a voltage divider circuit coupled to a second input of the second comparator, the voltage divider circuit comprising a fourth resistor connected between the second input and a positive voltage, and a fifth resistor connected between the second input and ground;

a diode connected between the junction of the fourth and fifth resistors and the output of the second comparator; and a sixth resistor connected between the output of the second comparator and a positive voltage.

11. The RPM control circuit of claim 8 wherein the integration node comprises:

a capacitor connected between a positive voltage and a first resistor;

the first resistor connected between ground and the capacitor; and a second resistor connected between the junction of the first resistor and the capacitor, and the latch circuit output.

12. The RPM control circuit of claim 8 wherein the power switch driver circuit comprises:

a third comparator having a first input connected to the integration node, and a second input conductively coupled to the ramp signal.

13. In a brushless direct current (DC) fan motor speed control system which generates a ramp signal and a tachometer pulse, a revolutions per minute (RPM) control circuit comprising:

reset means responsive to a ramp signal for generating a reset pulse at a reset output;

latching means conductively coupled to the reset output, and responsive to the reset pulse, and responsive to a tachometer pulse, for generating a latch pulse at a latching means output;

integration means conductively coupled to the latching means output, and responsive to the latch pulse, for generating an integral signal of the latch pulse; and a power switch driver means conductively coupled to the integration means, and responsive to the ramp signal and the integral signal, for generating an RPM control pulse.

14. In a fan speed control system which generates a ramp signal and a tachometer pulse, a method of controlling the revolutions per minute (RPM) of a brushless direct current (DC) fan motor, comprising the steps of:

in response to the ramp signal, generating a reset pulse at a reset output;

in response to the reset pulse, and in response to the tachometer pulse, generating a latch pulse at a latch output;

generating an integral signal of the latch pulse; and in response to the ramp signal and the integral signal, generating an RPM control pulse.

15. The RPM control circuit of claim 1 where a series of tachometer pulses occurs at a frequency, the integral signal having a voltage level inversely proportional to the frequency of the tachometer pulses.

16. The computer of claim 8 where the voltage level at the integration node is inversely proportional to the speed of the DC fan motor.

17. The integration node of claim 11 where the ratio of the first and second resistors determines a minimum speed of the DC fan motor.

18. The RPM control circuit of claim 8 where a series of tachometer pulses occurs at a frequency, the integral signal having a voltage level that is inversely proportional to the frequency of the tachometer pulses.

19. A revolutions per minute (RPM) control circuit for a direct current (DC) motor having frequency of rotation comprising:

a blanking and reset circuit responsive to a ramp signal for generating a reset pulse;

an integration circuit having an integrator, the integration circuit responsive to a series of tachometer pulses proportional to the frequency of rotation of the DC motor, the integration circuit responsive to the reset pulse, the integration circuit generating an integral signal having a voltage level dependent upon the frequency of the series of tachometer pulses; and a power switch driver circuit generating a series of RPM control pulses with each pulse having a width, the width controlling the frequency of rotation of the DC motor.

20. The RPM control circuit of claim 19 wherein the generation of the reset pulse by the blanking and reset circuit disables the responsiveness of the integration circuit to the series of tachometer pulses.

21. The RPM control circuit of claim 19 wherein the ramp signal having a frequency, the series of RPM control pulses occurring at a frequency proportional to the frequency of the ramp signal.

22. The RPM control circuit of claim 19 wherein the voltage level of the integral signal is inversely proportional to the frequency of the series of tachometer pulses.

23. The computer system of claim 8 wherein the generation of the reset pulse by the blanking and reset circuit disables the responsiveness of the latch circuit to the tachometer pulse.

* * * * *